United States Patent

Watanabe et al.

[11] Patent Number: 5,604,396
[45] Date of Patent: Feb. 18, 1997

[54] LUMINESCENT MATERIAL FOR MERCURY DISCHARGE LAMP INCLUDING PHOSPHOR AND A CONTINUOUS PROTECTIVE LAYER

[75] Inventors: Akio Watanabe, Kanagawa-ken; Shoji Naoki, Hyogo-ken; Masaaki Tamatani, Kanagawa-ken; Fumiyasu Yanagisawa, Kanagawa-ken; Kenji Terashima, Kanagawa-ken, all of Japan

[73] Assignees: Toshiba Lighting & Technology Corporation, Tokyo; Kabushiki Kaisha Toshiba, Kawasaki, both of Japan

[21] Appl. No.: 282,454

[22] Filed: Jul. 29, 1994

[30] Foreign Application Priority Data

| Jul. 30, 1993 | [JP] | Japan | 5-190548 |
| Aug. 24, 1993 | [JP] | Japan | 5-209473 |
| Mar. 29, 1994 | [JP] | Japan | 6-059545 |

[51] Int. Cl.⁶ .................................................. H01J 61/44
[52] U.S. Cl. ........................... 313/485; 313/486; 313/487
[58] Field of Search .................................. 313/486, 487, 313/485, 489; 252/301.4 R

[56] References Cited

U.S. PATENT DOCUMENTS 5,289,081  2/1994  Tamatani et al. .............. 313/486

FOREIGN PATENT DOCUMENTS

| 0479299 | 4/1992 | European Pat. Off. . |
| 0488330 | 6/1992 | European Pat. Off. . |
| 5325901 | 12/1993 | Japan . |
| 633052 | 2/1994 | Japan . |
| 673375 | 3/1994 | Japan . |

*Primary Examiner*—Nimeshkumar Patel
*Attorney, Agent, or Firm*—Cushman Darby & Cushman, IP Group of Pillsbury Madison & Sutro, LLP

[57] ABSTRACT

A luminescent material for a mercury discharge lamp comprises a phosphor material including phosphor particles for emitting a luminous flux upon excitation by ultraviolet radiation at 254 nm and a protective layer continuously formed on the phosphor particle with at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, CaO, $ZrO_2$, SrO, BaO, $\alpha$-$Al_2O_3$ and BeO. A mercury discharge lamp has a luminescent layer coated with the luminescent material on the wall of the light transmissive bulb thereof.

19 Claims, 2 Drawing Sheets

LUMINESCENT MATERIAL FOR MERCURY DISCHARGE LAMP INCLUDING PHOSPHOR AND A CONTINUOUS PROTECTIVE LAYER

BACKGROUND OF THE INVENTION

1. Field of the Invention

The present invention relates to a luminescent material for a mercury discharge lamp and more particularly to a luminescent material for a fluorescent lamp, which includes a phosphor material emitting a luminous flux upon excitation by ultraviolet radiation having a wavelength of 254 nm.

2. Description of the Related Art

A mercury vapor discharge lamp, such as a fluorescent lamp is widely used as a light sources for general illumination purposes, office automation machines, light-emitting elements of the giant screen color display apparatus and back lights for liquid crystal displays. The fluorescent lamp has a luminescent layer composed of a phosphor and formed on an inner envelope of a glass tube in which mercury and one or more rare gases are filled. Electrodes are opposingly arranged in the glass tube and a discharge is caused therebetween. Mercury in the glass tube is vaporized by the discharge, and mainly ultraviolet radiation is produced. A comparatively small part of the ultraviolet radiation has a wavelength of 185 nm while the greatest part has a wavelength of 254 nm. Upon excitation of the phosphor by the ultraviolet radiation, a luminous flux or visible light is produced. The visible light is irradiated outside the glass tube. As for the general illumination purposes, a three band type fluorescent lamp, which efficiently generates white light and has excellent color rendering properties, has become popular. The luminescent layer of the three band type fluorescent lamp is composed of blue, green and red emitting phosphors each having a relatively narrow band emission spectrum distribution.

The fluorescent lamp mentioned above has a drawback because the luminous efficacy is reduced as the number of operating hours increases. In particular the reduction of the luminous efficacy in a high wall loaded fluorescent lamp is considerably higher. As disclosed in Japanese Patent Disclosure (Kokoku) 3-45505, the reduction in the luminous efficacy has been assumed to be caused by the following two factors. First, the phosphor material itself is deteriorated by ultraviolet radiation having a wavelength of 185 nm. Although the intensity ratio of ultraviolet radiation having a wavelength of 185 nm to that of a wavelength of 254 nm is about 10 to 12%, it becomes more than 12% when the fluorescent lamp is operated with a relatively high wall load as compared to the conventional fluorescent lamp.

The lamp tube can be formed in various shapes like a circle, a U-shape, a saddle-shape and other complicated shapes in addition to the ordinary straight tube. As the fluorescent lamp has been made smaller in size, the wall load of the lamp increases. A phosphor material coated on the small lamp tube is deteriorated and the luminous flux emitted from the phosphor material is lowered accordingly.

Second, the reduction of the luminous efficacy is caused by blackening of the lamp partly or fully on the inner wall of the lamp tube. The blackening is mainly due to the deposition of residues of organic binders and/or electrode substances. However, the adhesion of mercury or its compound to the phosphor material coated as the luminescent layer on the inner wall of the lamp tube is believed to cause the blackening. The reason why mercury adheres to the phosphor material is supposedly because of attractive forces exerted on mercury and the phosphor material. It is also believed that the phosphor material is deteriorated by ion and/or atom bombardments.

The Japanese Patent Disclosure (Kokoku) 3-45505 discloses phosphor materials as preferred illuminating materials for fluorescent lamps operated with a relatively high wall load. The phosphor materials are less deteriorative against ultraviolet radiation at 185 nm and less reactive to mercury. However, the phosphor materials are required to satisfy a property of having at 254 nm-excitation a luminous flux, which, after the phosphor materials have been subjected for 15 minutes to ultraviolet radiation of a wavelength of mainly 185 nm and 254 nm, a radiation density between 150 and 500 W/m$^2$, and a ratio of 185 nm power between 0.20 and 0.40, is not more than 5% lower than the initial luminous flux of the phosphor materials also at the 254 nm excitation and measured in identical circumstances. A combination of cations in the phosphor materials has an electronegativity of not more than 1.4.

SUMMARY OF THE INVENTION

The present invention has for its object the provision of an improved luminescent material containing a phosphor material for a fluorescent lamp operated with a relatively high wall load wherein the improved luminescent material is less deteriorative against ultraviolet radiation at 185 nm and less reactive to mercury and the phosphor material is not necessiated to satisfy the property and other conditions described above.

According to a first aspect of the present invention, a luminescent material for a fluorescent lamp comprises a phosphor material including phosphor particles for emitting a luminous flux upon excitation by ultraviolet radiation having a wavelength of 254 nm and a protective layer continuously formed on the phosphor particle for substantially preventing ultraviolet radiation at 185 nm from transmitting therethrough.

According to a second aspect of the present invention, the protective layer is composed of a specific metal oxide so as to prevent mercury from adhering the phosphor particles. For the protective layer, at least one metal oxide is selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, CaO, $ZrO_2$, SrO, BaO, $\alpha$-$Al_2O_3$ and BeO.

According to a third aspect of the present invention, the metal oxide has the energy gap ranging from 5 electron volts to 8 electron volts at the forbidden band, which substantially corresponds to quantum energy of ultraviolet at 185 nm.

According to a fourth aspect of the present invention, the metal oxide has an metal ion electronegativity Xi ranging from 5 to 9, wherein $Xi=(1+2Z)X_o$ in which Z represents an ion valence of the metal ion and $X_o$ denotes Pauling's electronegativity.

BRIEF DESCRIPTION OF THE DRAWINGS

The accompanying drawings, which constitute a part of the specification, illustrate presently preferred embodiments of the invention, and together with the general description given above and detailed description of the preferred embodiments given below, explain the principles of the present invention.

DETAILED DESCRIPTION OF PREFERRED EMBODIMENTS

Figure 1:
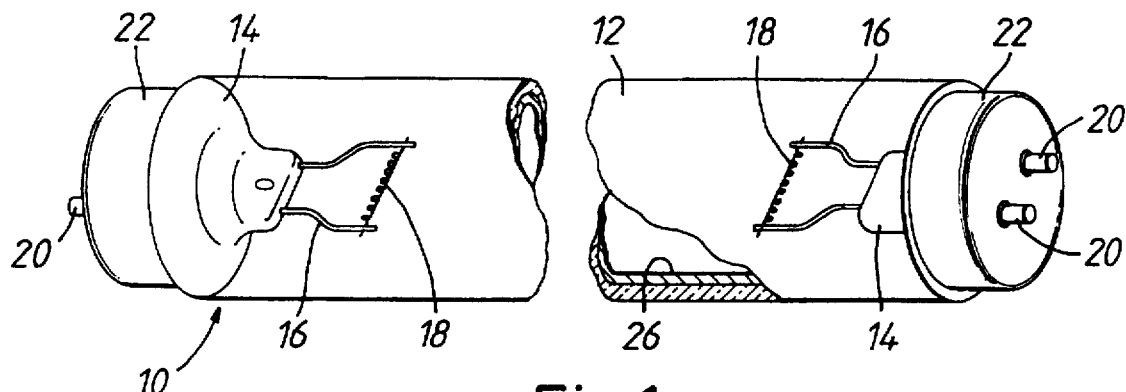
FIG. 1 is a schematic view, partly in section, of a fluorescent lamp constructed in accordance with the present invention.

Referring now to FIG. 1, a fluorescent lamp 10 has a tubular glass bulb 12 fabricated of soda-lime glass and mounts 14 sealed into either end thereof. Each mount 14 comprises a vitreous portion sealed to an end of the bulb 12 with lead-in conductors 16 sealed therethrough and supporting at their inwardly extending extremities refractory metal coils 18, which are fabricated of tungsten, for example. Contained within turns of these coils 18 is a conventional electron emitting material (not shown) such as BaO, SrO or CaO. Electrical connection for the lead-in conductor 16 is effected by contact pins 20 which project from supporting base caps 22 at either end of the lamp 10. The glass bulb 12 contains a filling of argon or any other inert, ionizable gas in order to facilitate starting, as well as a small charge of mercury. In the operation of the lamp 10, when the electrodes 18 are electrically connected to a source of predetermined energizing potential via contact pins 20, a gas discharge is sustained between electrodes 18. The gas discharge generates ultraviolet radiation, a great part of which has a wavelength of 254 nm and a comparatively small part of which has a wavelength of 185 nm.

The glass bulb 12 has coated on its interior surface or inner wall a luminescent layer 26. The luminescent layer 26 is comprised of a phosphor material 28 such as ($Ca_5(Po_4)_3$(F, Cl): Sb, Mn), for example. A three-component of mixture of blue, green and red emitting phosphor materials containing rare-earth metals may be used for the luminescent layer 26 emitting blue, green and red lights each having a relatively narrow band emission spectrum. Trivalent europium-activated yttrium oxide in accordance with the formula ($Y_{0.955}$, $Eu_{0.045}$)$_2$)$O_3$ for red emission, bivalent europium-activated halophosphate phosphor material in accordance with formula ($Sr_{0.55}$, $Ba_{0.35}$, $Eu_{0.01}$)$_{10}(PO_4)_6Cl_2$ for blue emission and telbium-activated cerium containing phosphor material in accordance with formula ($La_{0.50}$,$Ce_{0.35}$, $Tb_{0.15}$)$_2O_3 \cdot P_2O_5 \cdot _{0.0005}B_2O_3$ for green emission are preferable.

Figure 2:
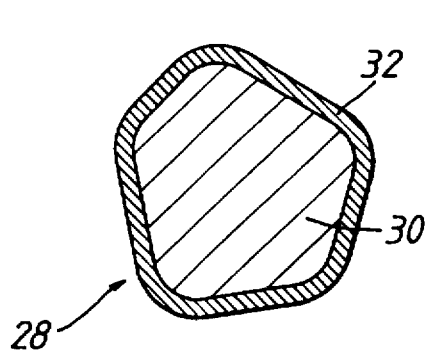
FIG. 2 is an enlarged cross sectional view of a luminescent material for the fluorescent lamp in accordance with the present invention.

The phosphor material 28 includes fine phosphor particles or phosphors 30 on which a continuous layer 32 is formed as shown in FIG. 2. The layer (herein-after also called the protective layer) prevents ultraviolet at 185 nm from transmitting to the phosphors 30 therethrough. The protective layer 32 is composed of a metal oxide having more than 80% spectral transmittance for ultraviolet at 254 nm and less than 50% spectral transmittance for the ultraviolet at 185 nm. Metal oxides such as MgO, $Y_2O_3$, $ZrO_2$ and SrO are preferable for the protective layer 32, as these oxides excellently transmit the ultraviolet at 254 nm and effectively reflect or block the ultraviolet at 185 nm. However other metal oxides such as $La_2O_3$, $Sm_2O_3$, $Gd_2O_3$, $Dy_2O_3$, $Ho_2O_3$, $Er_2O_3$, $Yb_2O_3$, $Lu_2O_3$, $\alpha\text{-}Al_2O_3$ and BeO may also be used as the protective layer 32. The protective layer 32 is composed of at least one metal oxide selected from the group consisting of MgO, $Y_2O_3$, $La_2O_3$, $Sm_2O_3$, $Gd_2O_3$, $Dy_2O_3$, $Ho_2O_2$, $Er_2O_3$, $Yb_2O_3$, $Lu_2O_3$, $ZrO_2$, SrO, $\alpha\text{-}Al_2O_3$ and BeO and the amount thereof in the phosphor material is in the range of 0.005 wt % to 3.0 wt %.

Figure 4:
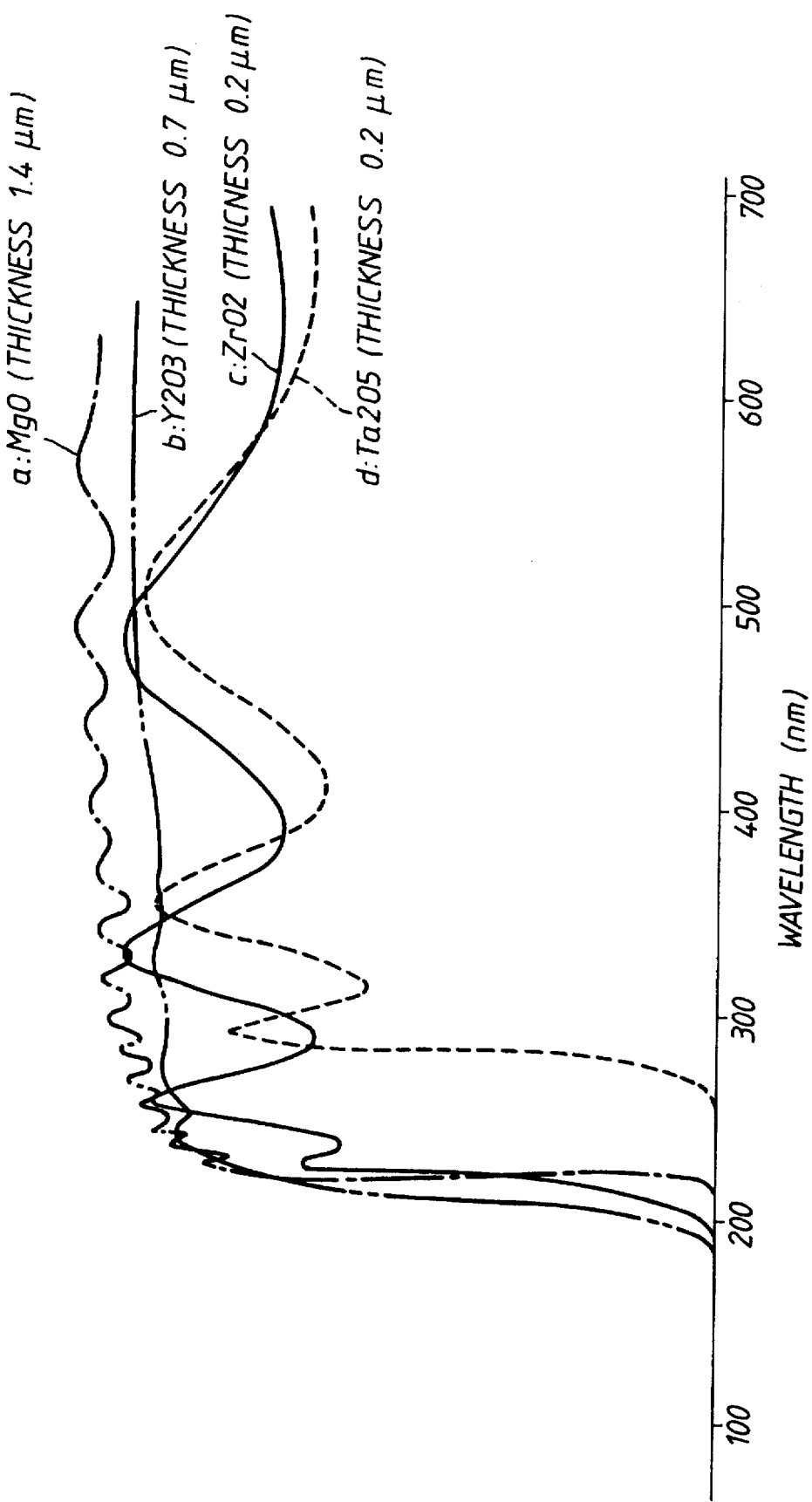
FIG. 4 is a graph showing the spectral transmittance of various metal oxides.

FIG. 4 is a graph showing the spectral transmittance of metal oxide layers MgO, $Y_2O_3$, $ZrO_2$ and $Ta_2O_5$ each having an average (mean) thickness of 1.4 μm, 0.7 μm, 0.2 μm and 0.2 μm, respectively. As can be seen in the graph, MgO, $Y_2O_3$, and $ZrO_2$ exhibit a high transmittance for ultraviolet having wave lengths of more than 254 nm and a low transmittance for ultraviolet having wavelengths less than 220 nm. On the other hand $Ta_2O_5$ exhibits a low transmittance for ultraviolet having wavelengths less than 380 nm. Metal oxide layers composed of $Ta_2O_5$ are not recommended for the protective layer 32 because the conversion from the ultraviolet radiation at 254 nm to visible light is not effected by the phosphor 30.

The intensity ratio of ultraviolet radiation at 185 nm to that at 254 nm in the popular 40 W type fluorescent lamp (0.0029 W/cm$^2$) having a bulb length of 1200 mm and an inner diameter of 37 mm is about 0.12 while it is about 0.2 in the high output type fluorescent lamp (FLR60 D/A) (0.043 W/cm$^2$) having a bulb length of 1200 mm and an inner diameter of 37 mm. If the protective layer 32 is used for the high output type fluorescent lamp, it reduces the amount of the ultraviolet at 185 nm reaching to the phosphor particles 30, which is equal to a decrease in the intensity ratio of the 185 nm radiation to the 254 nm radiation to 0.15 or less.

In order to preliminary evaluate the protective layer 32, three sample phosphor materials each having a different metal oxide layer of $ZrO_2$, $Y_2O_3$ or MgO continuously formed on were prepared. The phosphors having formula $SrB_4O_7$:Eu is more deteriorative by the 185 nm radiation than the phosphors having formula $Ca_5(Po_4)_3$ (F,Cl):(Sb, Mn) so that the effect of the sample phosphor material is easily appreciated.

The sample phosphor material was prepared by the following method. First, the phosphor was dispersed into a solvent such as 500 ml of ethanol. A metal alkoxide solution containing one metal selected from Zr, Y and Mg was added to the phosphor-dispersed solution to provide slurries. A predetermined amount of the metal was used so as to contain the metal oxide in the protective layer of the phosphor material in the range of 0.005 to 3.0 wt %, such as 1 wt %. The slurries were kept in a stirred vessel for a predetermined period at 70° C. to 90° C. to cause hydrolysis of the metal alkoxide solution. Polymerization of the metal oxide occurred on the surface of the phosphor particles. An excess of the alcohol solvent was volatilized and the polylmerized metal oxide was dried and heated so as to obtain the continuous metal oxide layer on the phosphor particles.

Three test fluorescent lamps were also provided with the sample phosphor materials. Each test fluorescent lamp which has a glass bulb having an inner diameter of 13.5 mm and a length of 350 mm was operated with wall load of 0.007 W/cm$^2$. Lumen maintenance rates of the test lamps at 100 hours, 1000 hours and 2000 hours were measured. The results of the measurement are shown in TABLE I in addition to the lumen maintenance rates of two reference fluorescent lamps similarly fabricated to the test lamps, but one of the fluorescent lamps has a continuous metal oxide layer formed with $\gamma\text{-}Al_2O_3$ on the phosphor particles and the other lamp has no such metal oxide layer formed on the phosphor particle.

TABLE I

| Metal Oxide | (Hr) | | | |
| --- | --- | --- | --- | --- |
| | 0 | 100 | 1000 | 2000 |
| $ZrO_2$ | 100% | 92% | 85% | 76% |
| $Y_2O_3$ | 100% | 93% | 88% | 80% |
| MgO | 100% | 94% | 82% | 72% |
| No layer | 100% | 78% | 61% | 48% |
| $\gamma$-$Al_2O_3$ | 100% | 88% | 77% | 59% |

The lumen maintenance rate at 2000 hours for each test lamp according to the invention exhibits more than 70% while it is less than 59% for the reference lamps. The metal oxide layer formed with $ZrO_2$, $Y_2O_3$ or MgO clearly improves the luminous efficacy because such metal oxide layer functions to prevent ultraviolet radiation at 185 nm from transmitting to the phosphor particles therethrough while it transmits ultraviolet radiation at 254 nm efficiently. The metal oxide layer itself is less reactive to mercury whereby it also functions to prevent mercury from adhering and reacting to phosphor particles.

The protective layer is not limited to the metal oxide selected from $ZrO_2$, $Y_2O_3$ and MgO, it may be at least one metal oxide selected from the group consisting of $La_2O_3$, $Sm_2O_3$, $Gd_2O_3$, $Dy_2O_3$, $Ho_2O_3$, $Er_2O_3$, $Yb_2O_3$, $Lu_2O_3$, SrO, $\alpha$-$Al_2O_3$ and BeO.

A precise correspondence between the energy gap at the forbidden band of the metal oxides and the quantum energy of ultraviolet could not be obtained. However, as shown in TABLE II it was substantially confirmed that a preferable protective layer 32 has an energy gap ranging from 5 electron volts to 8 electron volts at the forbidden band substantially corresponding to quantum energy of ultraviolet at 185 nm. It is assumed if a metal oxide layer has energy gap less than 5 electron volts, ultraviolet at 254 nm is effectively absorbed by the metal oxide layer. It is also assumed if a metal oxide layer has an energy gap of more than 8 electron volts, the ultraviolet at 185 nm is not absorbed by the metal oxide layer.

TABLE II

| Metal Oxide | Energy Gap (eV) | Metal Ion Electronegativity |
| --- | --- | --- |
| MgO | 7.3 | 6 |
| $Y_2O_3$ | — | 8.4 |
| $La_2O_3$ | 5.4 | 7.7 |
| $Sm_2O_3$ | 5.0 | 7.7 |
| $Gd_2O_3$ | 5.3 | 7.7 |
| $Dy_2O_3$ | 5 | 7.7 |
| $H_2O_3$ | 5.42 | 7.7 |
| SrO | 5.7 | 5 |
| $Er_2O_3$ | 5.42 | 7.7 |
| $Yb_2O_3$ | 5.22 | 7.7 |
| $Lu_2O_3$ | 5.5 | 7.7 |
| $\alpha$-$Al_2O_3$ | 7.0 | — |
| BeO | 5.2 | 7.5 |
| ZnO | 2.62 | — |
| $TiO_2$ | 3.7 | — |
| $\gamma$-$Al_2O_3$ | — | 10.5 |
| $B_2O_3$ | 4.89 | 14 |

As examined the metal ion electronegativity Xi of the metal oxides, it was found that it is in a range of 5 and 9 as shown in TABLE II, wherein $Xi = (1+2Z)X_o$ in which Z represent the ion valency of a metal ion and $X_o$ represents Pauling's electronegativity. Metal oxides having the metal ion electronegativity ranging from 5 to 9 exert less attractive force to mercury oxides. Metal ion electronegativity of CaO and BaO falls within the range.

It has been observed that spectral transmittance of the metal oxide layer for ultraviolet at 254 nm falls when the thickness of the layer increases. When the metal oxide layer is used in an amount of more than 3 wt % to the phosphor material, the transmittance of the ultraviolet at 254 nm is lost due to the excessively formed metal oxide particles in the layer. Transparency of the layer is also lost when the metal oxide layer is formed by using a metal alkoxide solution in which the metal oxide particles are left as the residue. When the metal oxide layer is used in an amount of less than 0.005 wt % to the phosphor material, the layer will not work as the protective layer against ultraviolet at 185 nm and mercury.

Preferred phosphors (or phosphor particles) employed in accordance with the present invention are named below.

General formula: a$(M_1, Eu)O \cdot bAl_2O_3$, wherein $M_1$ is at least one selected from Zn, Mg, Ca, Sr, Ba, Li, Rb and Cs and a>0, b>0, $0.2 \leq a/b \leq 1.5$ (aluminate phosphors activated by bivalent europium)

General formula: a$(M_1, Eu, Mn)O \cdot bAl_2O_3$, wherein $M_1$ is at least one selected from Zn, Mg, Ca, Sr, Ba, Li, Rb and Cs and a>0, b>0, $0.2 \leq a/b \leq 1.5$ (aluminate phosphors activated by bivalent europium and manganese)

General formula: $(M_2, Eu)_{10}(PO_4)_6 \cdot X_2$ wherein $M_2$ is at least one selected from Mg, Ca, Sr and Ba and X is at least one selected from F, Cl and Br (halophosphate phosphors activated by bivalent europium)

General formula: $(Y_{1-s}, Eu_s)_2O_3$, wherein $0.005 \leq s \leq 0.20$ (yittrium oxide phosphors activated by trivalent europium)

General formula: $(Y_{1-s}, Eu_s)_2O_2S$, wherein $0.005 \leq s \leq 0.20$ (yittrium oxysulfide phosphors activated by trivalent europium)

General formula: $(Y_{1-s}, Eu_s)(P, V)O_4$, wherein $0.005 < s < 0.20$ (yittrium phospho-vanadate phosphors activated by trivalent europium)

General formula: $(RE_{1-x-y}, Tb_x, Ce_y)_2O_3 \cdot cAl_2O_3 \cdot bSiO_2 \cdot eP_2O_5$ wherein RE is at least one selected from Y, La and Gd and x>0, y>0, $0.1 \leq x+y \leq 0.07$, $c \geq 0$, $d \geq 0$, e>0, $0.08 \leq c+d+e \leq 1.30$ General formula: $(RE_{1-x-y}, Tb_x, Ce_y)_2O_3 \cdot fSiO_2 \cdot gP_2O_5 \cdot hB_2O_3$, wherein RE is at least one selected from Y, La and Gd and x>0, y>0, $0.1 \leq x+y \leq 0.07$, $f \geq 0$, g>0, $5.0 \times 10^{-6} \leq h \leq 6.0 \times 10^{-3}$, $0.8 \leq f+g+h \leq 1.30$ General formula: $(RE_{1-t-w}, Tb_t, Ce_u)_2O_3 \cdot iM_3O \cdot j(Al By)_2O_3$, wherein RE is at least one selected from Y, La and Gd, M is at least one selected from Zn, Mg, Ca, Sr and Ba and $0.5 \leq i \leq 4.0$, $0.2 \leq j \leq 1.40$, $0 < t+u \leq 1.0$, $v < 1.0 \times 10^{-4}$ Phosphor materials for applying in fluorescent lamps were prepared in a similar manner as explained above from the phosphors and the metal oxides shown in TABLE III and TABLE IV. Continuous layers of the metal oxides were formed on the phosphors (phosphor particles). The phosphor materials were applied in the fluorescent lamps as described with reference to FIG. 1. Applying the phosphor materials to the fluorescent lamp in order to form the luminescent layer on the inner wall of the bulb was carried out in a conventional manner, for example by mixing the phosphor materials with solvent, coating the tube wall with suspension of the phosphor materials, drying and heating or remove a binder.

Five lamps were made for each example. In order to evaluate the fluorescent lamps thus made, two different types of fluorescent lamps were also provided. One type (comparison sample type A) was the fluorescent lamp, which was provided with a luminescent layer made of the same phosphor used in the sample. Metal oxide layers on the phosphor particles were not formed in the comparison sample type A. The other type (comparison sample type B) was the fluorescent lamp, which was provided with a luminescent layer made of the same phosphors and the metal oxides used in the sample. However, continuous metal oxide layers were not formed on the phosphor particles. Five lamps were made for each type.

Measurement of the luminous output (lumen/W) of the lamps at 0 hour (after stabilizing of the lamp) and 1000 hours was carried out. Both of the initial luminous output and that after 1000 hours lighting are shown as relative values when each value of the comparison sample type A is expressed 100%. The differences of the two extremes in the luminous output for both of the example and the comparison sample type B are shown as a deviation value in TABLE III and TABLE IV. Explanations on examples 1 to 3 are described below.

EXAMPLE 1

0.12 g of magnesium (metal) was dissolved in 100 cc of methoxyethanol [$CH_3OCH_2CH_2OH$] to provide diethoxymagnesium solution [$Mg(C_2H_5)$]. 18.5 g of blue emitting phosphors representing the formula ($Sr_{0.55}$, $Ca_{0.35}$, $Ba_{0.01}$, $Eu_{0.01}$)($PO_4$)$Cl_2$, 40.0 g of green emitting phosphors representing the formula ($La_{0.50}$, $Ce_{0.35}$, $Tb_{0.15}$)$_2O_3$19 $0.985PO_5 \cdot 0.0005B_2O_3$ and 1.5 g of red emitting phosphors representing the formula ($Y_{0.955}$, $Eu_{0.045}$)$_2O_3$ were added to the diethoxymagnesium solution under stirring to prepare slurries. The slurries was kept in a vessel at about 80° C. for about 1 hour to volatilize ethanol therefrom. Uniform layers of diethoxymagnesium were formed on the surfaces of the phosphor particles. The phosphors having such layers were heated at about 500° C. for about one hour to form magnesium oxide layers on the phosphor particles. The amount of the magnesium oxide layers uniformly formed on the phosphor particles was 0.2 wt %. Phosphor materials including the oxide layers formed on the phosphor particles thereof were thus obtained.

The phosphor materials were applied on the glass bulb having a diameter of 15.5 mm. Each lamp was operated at 4 W (wall load, 0.11 W/cm$^2$).

EXAMPLE 2

1.21 g of trimethoxyyttrium [$Y(OCH_3)_3$] was dissolved in 150 cc of xylene to provide trimatxiyttrium solution. 150 g of red emitting phosphors representing the formula ($Y_{0.960}$, $Eu_{0.040}$)$_2O_2S$ were added to the trimethoxyyttrium solution under stirring to prepare slurries. The slurries were kept in a vessel at about 70° C. to volatilize methanol therefrom. Powdered substances were left in the vessel. The powdered substances were then heated at about 600° C. for about five hours. Phosphor materials including yttrium oxide layers formed on the phosphor particles thereof were finally obtained. The amount of the oxide layers was 0.5 wt %.

The phosphor materials were applied on the glass bulb having a diameter of 15.5 mm. Each lamp was operated at 4 W (wall load, 0.11 W/cm$^2$).

EXAMPLE 3

0.139 g of dibutoxybarium [$Ba_2(OC_4H_9)_2$] was dissolved in 150 cc of butyl alcohol to provide dibutoxybarium solution. 150 g of green emitting phosphors representing the formula ($La_{0.60}$, $Ce_{0.25}$, $Te_{0.15}$)$_2O_3 \cdot P_2O_5$ were added to the dibutoxybarium solution under stirring to prepare slurries. The slurries were kept in a vessel at about 90°C. Powdered substances were left in the vessel after volatilizing the butyl alcohol. The powdered substances were then heated at about 600° C. for about one hour. Phosphor materials were finally obtained. The phosphor materials contains uniform layers of barium oxide formed on the surfaces of the phosphor particles. The amount of the oxide layers was 0.05 wt %.

The phosphor materials were applied on the glass bulb having a diameter of 15.5 mm. Each lamp was operated at 4 W (wall load, 0.11 W/cm$^2$).

EXAMPLES 4 TO 14

Phosphor materials of the examples 4 to 14 were also prepared with the phosphors and metal oxides shown in TABLE III and TABLE IV by the similar way as described above. Fluorescent lamps having such luminescent layers formed from the phosphors material were operated in order to evaluate them. The results of the evaluation were shown in TABLE III and TABLE IV.

TABLE III

| | | Metal Oxide | | Initial | | | 1000 Hours | | | |
| | | | | Luminous | Deviation(%) | | Luminous | Deviation(%) | | |
| Example | Phosphor | Composition | Concentration (wt %) | output (Relative value %) | Example | Sample type B (min) | output (Relative value %) | Example | Sample type B (min) | Wall Load (w/cm$^2$) |
|---|---|---|---|---|---|---|---|---|---|---|
| 1 | ($Sr_{0.55}Ca_{0.35}Eu_{0.01}$)$_{10}$($PO_4$)$_6 \cdot Cl_2$(18.5%) ($La_{0.50}Ce_{0.35}Tb_{0.5}$)$_2O_3 \cdot$ $0.985P_2O_5 \cdot 00005B_2O_3$(40.0%) ($Y_{0.955}Eu_{0.45}$)$_2O_3$ | $Mg_{1.00}$ | 0.20 | 100.5 | ±1.5 | −3.5 | 101.0 | ±1.5 | −5.0 | 0.11 |
| 2 | ($Y_{0.960}Eu_{0.40}$)$_2O_2S$ | $Y_{1.00}$ | 0.50 | 99.5 | ±1.0 | −4.0 | 101.5 | ±1.5 | −6.0 | 0.11 |
| 3 | ($La_{0.60}Ce_{0.25}Tb_{0.15}$)$_2O_3 \cdot 0.995P_2O_5$ | $Ba_{1.00}$ | 0.05 | 100.0 | ±1.5 | −3.0 | 100.0 | ±2.0 | −5.0 | 0.11 |
| 4 | 3($Ba_{0.30}Mg_{0.67}Eu_{0.03}$)$O \cdot 8Al_2O_3$ | $Ca_{1.00}$ | 2.00 | 99.6 | ±1.0 | −3.5 | 100.5 | ±1.5 | −5.5 | 0.04 |
| 5 | ($Ba_{0.60}Sr_{0.20}Ca_{0.15}Mg_{0.04}Eu_{0.01}$)$_{10}$($PO_4$)$_6 \cdot Cl_2$ | $Sr_{1.00}$ | 0.01 | 101.0 | ±1.5 | −3.0 | 102.0 | ±2.0 | −4.0 | 0.04 |
| 6 | ($Sr_{0.65}Ca_{0.30}Eu_{0.01}$)$_{10}$($PO_4$)$_6 \cdot Cl_2$ | $Mg_{0.60}$ $Y_{0.40}$ | 0.05 | 100.0 | ±1.5 | −3.0 | 101.0 | ±2.0 | −4.0 | 0.09 |
| 7 | 3($B_{0.28}Mg_{0.03}Eu_{0.05}$)$O \cdot 8Al_2O_3$ | $Ba_{0.30}$ $Y_{0.70}$ | 1.00 | 99.5 | ±1.0 | −3.5 | 100.0 | ±1.5 | −5.5 | 0.15 |
| 8 | ($La_{0.45}Ce_{0.40}Tb_{0.15}$)$_2O_3 \cdot 0.003Al_2O_3 \cdot$ $0.0005SiO_2 \cdot 0998P_2O_5$ | $Ca_{0.10}$ $Ba_{0.40}$ $Mg_{0.50}$ | 3.00 | 99.0 | ±1.0 | −2.0 | 100.5 | ±1.5 | −5.0 | 0.15 |

TABLE IV

| Example | Phosphor | Metal Oxide Composition | Metal Oxide Concentration (wt %) | Initial Luminous output (Relative value %) | Initial Deviation(%) Example | Initial Deviation(%) Sample type B (min) | 1000 Hours Luminous output (Relative value %) | 1000 Hours Deviation(%) Example | 1000 Hours Deviation(%) Sample type B (min) | Wall Load (w/cm$^2$) |
|---|---|---|---|---|---|---|---|---|---|---|
| 9 | $(Y_{0.955}Eu_{0.45})_2O_3$ | $Y_{1.00}$ | 0.05 | 100.0 | ±1.5 | −3.5 | 101.0 | ±2.5 | −5.0 | 0.07 |
| 10 | $3(Ba_{0.30}Mg_{0.67}Eu_{0.03})O.8Al_2O_3(12.0\%)$ $3(Ba_{0.28}Mg_{0.64}Eu_{0.03}Mn_{0.05})O.8Al_2O_3$ (13.0%) $(La_{0.50}Ce_{0.35}Tb_{0.15})_2O_3.0.99P_2O_3 \cdot$ $0.001B_2.0.0006SiO_2$ (42%) $(Y_{0.940}Eu_{0.060})_2O_3$ (38%) $3.5MgO.0.5MgF_2.GeO_2$ (5%) | $Sr_{0.20}$ $Mg_{0.50}$ $Y_{0.30}$ | 0.10 | 100.5 | ±1.0 | −3.0 | 101.5 | ±1.5 | −6.0 | 0.07 |
| 11 | $(Sr_{0.55}Ca_{0.35}Eu_{0.01})_{10}(PO_4)_6Cl_2$ | $Ca_{0.30}$ $Ba_{0.70}$ | 0.50 | 100.0 | ±1.0 | −3.0 | 100.5 | ±1.5 | −6.0 | 0.15 |
| 12 | $(Ce_{0.65}Tb_{0.35})MgAl_{11}O_{19}$ | $MG_{0.20}$ $Ca_{0.20}$ $Y_{0.60}$ | 0.50 | 100.0 | ±1.0 | −3.0 | 100.5 | ±1.5 | −6.0 | 0.15 |
| 13 | $(Y_{0.940}Eu_{0.60})_2O_3$ | $Mg_{0.50}$ $Ca_{0.10}$ $Y_{0.40}$ | 0.001 | 100.0 | ±4.0 | −4.0 | 100.0 | ±8.0 | −8.0 | 0.15 |
| 14 | $(La_{0.60}Ce_{0.25}Tb_{0.15})_2O_3.1.005P_2O_5$ | $Mg_{0.40}$ $Y_{0.60}$ | 4.00 | 100.0 | ±1.5 | −2.0 | 101.0 | ±2.0 | −3.0 | 0.15 |

As can be seen in TABLE III and TABLE IV, each luminous output of the sample lamps 1–12 at 0 hours is almost the same to that of the comparison sample type A (having no metal oxide layer) and they are more than 100% at 1000 hours. The deviation rates of the sample lamps 1 to 3 at 0 hours are within 1.5 and they are within 2.0 at 1000 hours. On the other hand, the deviation rates of the comparison sample type B at 0 and 1000 hours are about 3.0 and 5.0 toward negative direction, respectively. This means that the metal oxide layers continuously formed on the phosphor particles in the sample lamps 1 to 12 efficiently worked as protective layers against ultraviolet at 185 nm and mercury.

The sample lamps 13 and 14 were not preferred examples. The luminous outputs of the sample lamp 13 at 0 and 1000 hours are the same to that of the B type comparison sample and the deviation rates at 0 and 1000 hours are the same to that of the B type comparison sample. Regardless of the metal oxide layers formed on the phosphor particles in the sample 13 they did not work effectively. The metal oxide layer of the sample lamps 13 was not formed continuously due to a shortage of the metal oxide (the amount of the metal oxide in these sample was 0.001 wt %) and they were no longer protective layers against ultraviolet at 185 nm and mercury. In the sample lamp 14, the luminous output at initial was not improved due to an excess of the metal oxide, the amount of which was 4.0 wt %.

Figure 3:
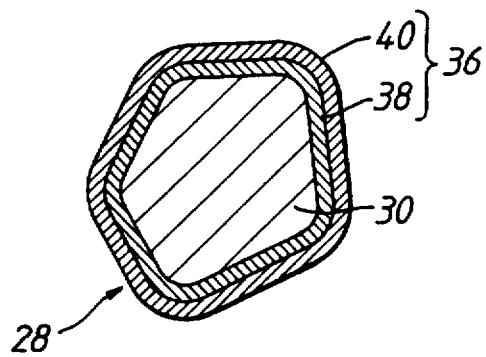
FIG. 3 is an enlarged cross sectional view of a modified luminescent material for the fluorescent lamp in accordance with the present invention.

The protective layer 32 on the phosphor particle 30 shown in FIG. 2 is formed with a single layer of metal oxides, however it may be a multilayer structure. FIG. 3 shows a protective layer 36 being a set of inner and outer layers 38, 40 formed on the phosphor particle 30. The inner layer 38 is composed of a metal oxide mainly for transmitting ultraviolet at 254 nm and visible light. The outer layer 40, which is formed with the metal oxide, surrounds the inner layer 38 and substantially prevents mercury from adhering to the phosphor particles 30.

The protective layer according to the invention may contain additives for the purposes such as to have a good layer strength, good layer formability or good adhesion with the phosphor particle. The phosphor material is coated directly on the inner wall of the bulb of the fluorescent lamp as shown in FIG. 1, however it is coated on a transparent conductive film when rapid-start type fluorescent lamps are fabricated. The phosphor material for fluorescent lamps according to the invention may be formed either directly or indirectly on the inner wall of the fluorescent lamps.

Figure 5:
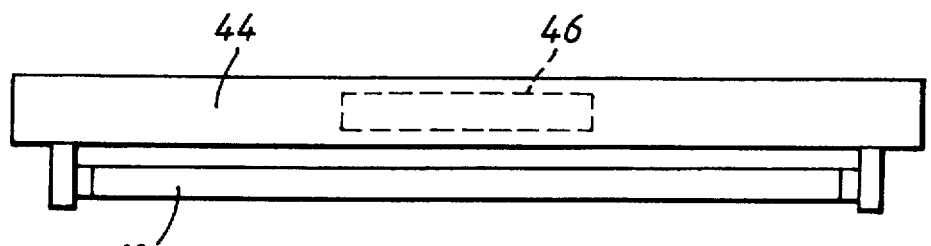
FIG. 5 is a schematic view of a lamp fixture mounting the fluorescent lamp shown in FIG. 1.

FIG. 5 shows a lamp fixture 44 in which the fluorescent lamp 10 described with FIG. 1 is fitted. In order for causing the discharge in the fluorescent lamp 10, electric energy is supplied to the electrodes 18 of the lamp from a lighting circuit 46 disposed in the lamp fixture 44.

It is to be understood that the phosphor material according to the invention is not limited in application to the fluorescent lamp described above, it is also applicable to fluorescent lamps having various bulb shapes, electrodeless fluorescent lamps operated with a high frequency source or mercury discharge lamps containing a large amount of rare gas.

Additional advantages and modifications will readily occur to those skilled in the art.

Accordingly, various modifications may be without departing from the spirit or scope of the general inventive concept as defined by appended claims.

What is claimed is:

1. A luminescent material for a mercury discharge lamp comprising:

a phosphor material including phosphor particles for emitting a luminous flux upon excitation by ultraviolet radiation at 254 nm; and a protective layer continuously formed on the phosphor particle and containing at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, CaO, $ZrO_2$, SrO, BaO, $\alpha$-$Al_2O_3$, and BeO for suppressing the deterioration of the phosphor material, said protective layer being formulated from an alcohol solution containing metal alkoxide.

2. A luminescent material according to claim 1, wherein a metal ion of the metal oxide has an electronegativity between 5 and 9.

3. A luminescent material according to claim 1, wherein the amount of the metal oxide formed on the phosphor particle is in a range of 0.005 wt % to 3.0 wt %.

4. A luminescent material according to claim 3, wherein the phosphor material includes a rare earth metal or the phosphor is activated by a rare earth metal.

5. A luminescent material for a mercury discharge lamp comprising:

a phosphor material including phosphor particles for emitting a luminous flux upon excitation by ultraviolet radiation at 254 nm; and a protective layer continuously formed on the phosphor particle and containing a metal oxide, said protective layer being formulated from an alcohol solution containing metal alkoxide, such that said protective layer has more than 80% spectral transmittance for ultraviolet radiation at 254 mn and less than 50% spectral transmittance for ultraviolet radiation at 185 nm, whereby deterioration of the phosphor material caused by the ultraviolet radiation at 185 nm is suppressed.

6. A luminescent material for a mercury discharge lamp comprising:

a phosphor material including phosphor particles for emitting a luminous flux upon excitation by ultraviolet radiation at 254 nm; and a protective layer continuously formed on the phosphor particle and containing a metal oxide, said protective layer being formulated from an alcohol solution containing metal alkoxide, such that said protective layer has an energy gap of 5 electron volts to 8 electron volts at a forbidden band thereof, and such that said protective layer is continuously formed on the phosphor particle for effectively absorbing ultraviolet radiation at 185 nm, whereby deterioration of the phosphor material caused by the ultraviolet radiation at 185 nm is suppressed.

7. A luminescent material according to claim 5 or 6, wherein the metal oxide is selected at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, $ZrO_2$, SrO, $\alpha\text{-}Al_2O_3$ and BeO.

8. A mercury discharge lamp comprising:

a light transmissive bulb;

a luminescent layer including a phosphor material formed on an inner wall of the light transmissive bulb;

a quantity of mercury and a quantity of rare gases filled in the light transmissive bulb; and means arranged for generating positive column discharge in the light transmissive bulb, wherein the phosphor material includes a protective layer continuously formed thereon and containing at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, CaO, $ZrO_2$, SrO, BaO, $\alpha\text{-}Al_2O_3$, and BeO for suppressing the deterioration of the phosphor material, said protective layer being formulated from an alcohol solution containing metal alkoxide.

9. A mercury discharge lamp according to claim 8, wherein a metal ion of the metal oxide has an electronegativity between 5 and 9.

10. A mercury discharge lamp according to claim 8, wherein the amount of the metal oxide is in a range of 0.005 wt % to 3.0 wt %.

11. A mercury discharge lamp comprising:

a light transmissive bulb;

a luminescent layer including a phosphor material formed on an inner wall of the light transmissive bulb;

a quantity of mercury and a quantity of rare gases filled in the light transmissive bulb; and means arranged for generating positive column discharge in the light transmissive bulb, wherein the phosphor material includes a protective layer continuously formed thereon and containing a metal oxide, said protective layer being formulated from an alcohol solution containing metal alkoxide, such that said protective layer has more than 80% spectral transmittance for ultraviolet radiation at 254 mn and less than 50% spectral transmittance for ultraviolet radiation at 185 nm.

12. A mercury discharge lamp according to claim 11, wherein the protective layer comprising at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, $ZrO_2$, SrO, $\alpha\text{-}Al_2O_3$ and BeO.

13. A mercury discharge lamp comprising:

a light transmissive bulb;

a luminescent layer including a phosphor material formed on an inner wall of the light transmissive bulb;

a quantity of mercury and a quantity of rare gases filled in the light transmissive bulb; and means arranged for generating positive column discharge in the light transmissive bulb, wherein the phosphor material includes a protective layer continuously formed thereon and containing a metal oxide, said protective layer being formulated from an alcohol solution containing metal alkoxide, such that said protective layer has an energy gap of 5 electron volts to 8 electron volts at a forbidden band thereof for effectively absorbing ultraviolet radiation at 185 nm.

14. A lamp device comprising:

a mercury discharge lamp including a light transmissive bulb, a luminescent layer that includes a phosphor material and is formed on an inner wall of the light transmissive bulb, the phosphor material including phosphor particles, a quantity of mercury and a quantity of rare gases filled in the light transmissive bulb and first means arranged for generating and sustaining positive column discharge in the light transmissive bulb, wherein the phosphor material includes a protective layer continuously formed thereon and containing at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, CaO, $ZrO_2$, SrO, BaO, $\alpha\text{-}Al_2O_3$, and BeO for suppressing the deterioration of the phosphor material, said protective layer being formulated from an alcohol solution containing metal alkoxide; and a lamp fixture for fixing the fluorescent lamp, said lamp fixture including electrical circuit means for supplying electric energy to the first means for generating and sustaining the positive column discharge.

15. A lamp device according to claim 14 wherein a metal ion of the metal oxide has an electronegativity between 5 and 9.

16. A lamp device according to claim 14, wherein the amount of the metal oxide is in a range of 0.005 wt % to 3.0 wt %.

17. A lamp device comprising:

a mercury discharge lamp including a light transmissive bulb, a luminescent layer that includes a phosphor material and is formed on an inner wall of the light transmissive bulb, the phosphor material including phosphor particles, a quantity of mercury and a quantity of rare gases filled in the light transmissive bulb and first means arranged for generating positive column discharge in the light transmissive bulb, wherein the phosphor material includes a protective layer continuously formed thereon and containing a metal oxide, said protective layer being formulated from an alcohol solution containing metal alkoxide, such that said protective layer has more than 80% spectral transmittance for ultraviolet radiation at 254 nm and less than 50% spectral transmittance for ultraviolet radiation at 185 nm.

18. A lamp device comprising:

a mercury discharge lamp including a light transmissive bulb, a luminescent layer that includes a phosphor material and is formed on an inner wall of the light transmissive bulb, the phosphor material including phosphor particles, a quantity of mercury and a quantity of rare gases filled in the light transmissive bulb and first means arranged for generating positive column discharge in the light transmissive bulb, wherein the phosphor material includes a protective layer continuously formed thereon and containing a metal oxide, said protective layer being formulated from an alcohol solution containing metal alkoxide, such that said protective layer has an energy gap of 5 electron volts to 8 electron volts at a forbidden band thereof for effectively absorbing ultraviolet radiation at 185 nm.

19. A lamp device according to claim 17 or 18, wherein the protective layer comprising at least one metal oxide selected from the group consisting of MgO, $Y_2O_3$, $La_2O_3$, $Sm_2O_3$, $Gd_2O_3$, $Dy_2O_3$, $Ho_2O_3$, $Er_2O_3$, $Yb_2O_3$, $Lu_2O_3$, $ZrO_2$, SrO, $\alpha$-$Al_2O_3$ and BeO.

* * * * *